(12) United States Patent
Abe

(10) Patent No.: US 6,282,022 B1
(45) Date of Patent: Aug. 28, 2001

(54) REAL-IMAGE FINDER OPTICAL SYSTEM

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/441,661

(22) Filed: Nov. 16, 1999

(30) Foreign Application Priority Data

Nov. 17, 1998 (JP) .................................................. 10-327234

(51) Int. Cl.$^7$ .............................. G02B 23/00; G02B 5/04
(52) U.S. Cl. ......................... 359/431; 359/831; 359/835
(58) Field of Search ........................... 359/362, 420–422, 359/431–433, 831–837; 396/373–386

(56) References Cited

U.S. PATENT DOCUMENTS

| | | | |
|---|---|---|---|
| 3,409,343 | * 11/1968 | Zapp | 359/431 |
| 3,655,260 | * 4/1972 | Bartucci et al. | 359/432 |
| 5,231,534 | * 7/1993 | Kato | 359/431 |
| 5,345,287 | 9/1994 | Taguchi | 396/378 |
| 5,563,671 | 10/1996 | Inazuka | 396/377 |
| 5,581,400 | * 12/1996 | Takase et al. | 359/362 |
| 5,606,383 | * 2/1997 | Daitoku et al. | 396/379 |
| 5,621,568 | * 4/1997 | Hasushita et al. | 359/432 |
| 5,625,487 | 4/1997 | Hasushita et al. | 359/432 |

FOREIGN PATENT DOCUMENTS 10282423   10/1998 (JP) .

* cited by examiner

*Primary Examiner*—Thong Nguyen
(74) *Attorney, Agent, or Firm*—Greenblum & Bernstein P.L.C.

(57) ABSTRACT

In a real-image finder optical system, at least two reflection surfaces are utilized for diopter adjustment, and wherein first and second diopter-adjusting reflection surfaces form a right angle therebetween; an optical axis from the objective optical system to the first diopter-adjusting reflection surface and an optical axis from the second diopter-adjusting reflection surface are parallel with each other; the two optical axes are perpendicular to the optical axis being incident from the object to the objective optical system; diopter adjustment is performed by integrally moving the first and second diopter-adjusting reflection surfaces so that the optical path length from the image forming plane of the objective optical system to the eyepiece optical system is varied; and the following condition is satisfied: $0.1 < L1/L2 < 0.4$; L1: the distance between the optical axis from the second diopter-adjusting reflection surface and the final surface of the eyepiece optical system; and L2: the distances between the most-object side surface of the objective optical system and the final surface of the eyepiece optical system.

13 Claims, 3 Drawing Sheets

REAL-IMAGE FINDER OPTICAL SYSTEM

BACKGROUND OF THE INVENTION

1. Field of the Invention

The present invention relates to a real-image finder optical system, and in particular, relates to a diopter adjustment mechanism.

2. Description of the Related Art

In a compact camera (for example), a real-image finder optical system has the own optical axis which is separate from the optical axis of the photographing optical system. The real-image finder optical system includes a positive objective optical system which forms an object's inverted image which is upside down and reversed from left to right, an erecting optical system which erects the inverted image to the same orientation as the object, and a positive eyepiece optical system through which the erected image is viewed.

In a real-image finder optical system of this type, diopter adjustment is conventionally carried out by moving the eyepiece lens element along the optical axis thereof. In such a diopter adjusting mechanism in which the position of the eyepiece lens element is adjusted, there is an advantage of not increasing the number of lens elements. However, since a space is required in order to move the eyepiece lens element along the optical axis thereof, the thickness of the camera body has to be increased. Alternatively, if the camera body is made small and thin, a space to allow the eyepiece lens element to move cannot be secured, and thereby the diopter adjusting range cannot be made large.

SUMMARY OF THE INVENTION

It is an object of the present invention to provide a real-image finder optical system which can obtain a large diopter adjusting range while the thickness of the camera body does not increase. To achieve the above mentioned object, there is provided a real-image finder optical system including a positive objective optical system, an erecting optical system constituted by a combination of a plurality of reflection surfaces, and a positive eyepiece optical system, and thereby an inverted image of an object, which is formed by the objective optical system and is upside down and reversed from left to right, is erected to the same orientation as the object by the erecting optical system, and the erected image is viewed through the eyepiece optical system. At least two reflection surfaces of the erecting optical system are utilized for diopter adjustment, and wherein (i) a first diopter-adjusting reflection surface and a second diopter-adjusting reflection surface come into contact with each other to form a right angle therebetween, (ii) an optical axis extending from the side of the objective optical system to the first diopter-adjusting reflection surface and an optical axis being reflected by and extending from the second diopter-adjusting reflection surface are substantially parallel with each other, (iii) these two optical axes are substantially perpendicular to an optical axis being incident from the object to the objective optical system, (iv) diopter adjustment is performed by integrally moving the first and second diopter-adjusting reflection surfaces so that the optical path length from the image forming plane of the objective optical system to the eyepiece optical system is varied, and (v) the following condition is satisfied:

$$0.1 < L1/L2 < 0.4 \quad (1)$$

wherein

L1 designates the distance, extending in the direction parallel with the optical axis being incident from the object to the objective optical system, between the optical axis reflected by and extending from the second diopter-adjusting reflection surface and the final surface of the eyepiece optical system; and L2 designates distances, extending in the direction parallel with the optical axis being incident from the object to the objective optical system, between the most-object side surface of the objective optical system and the final surface of the eyepiece optical system.

It is practical that the moving direction of the diopter-adjusting reflection surfaces is perpendicular with respect to the optical axis being incident from the object to the objective optical system.

The first and second diopter-adjusting reflection surfaces can be formed as a right-angle prism. The right-angle prism is preferably made of a synthetic resin material from the viewpoint of costs. The first and second diopter-adjusting reflection surfaces can also be formed by a mirror unit which integrally connects two plane mirrors. Preferably, the mirror unit is also made of a synthetic resin material from the viewpoint of costs.

The present disclosure relates to subject matter contained in Japanese Patent Application No.Hei-10-327234 (filed on Nov. 17, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
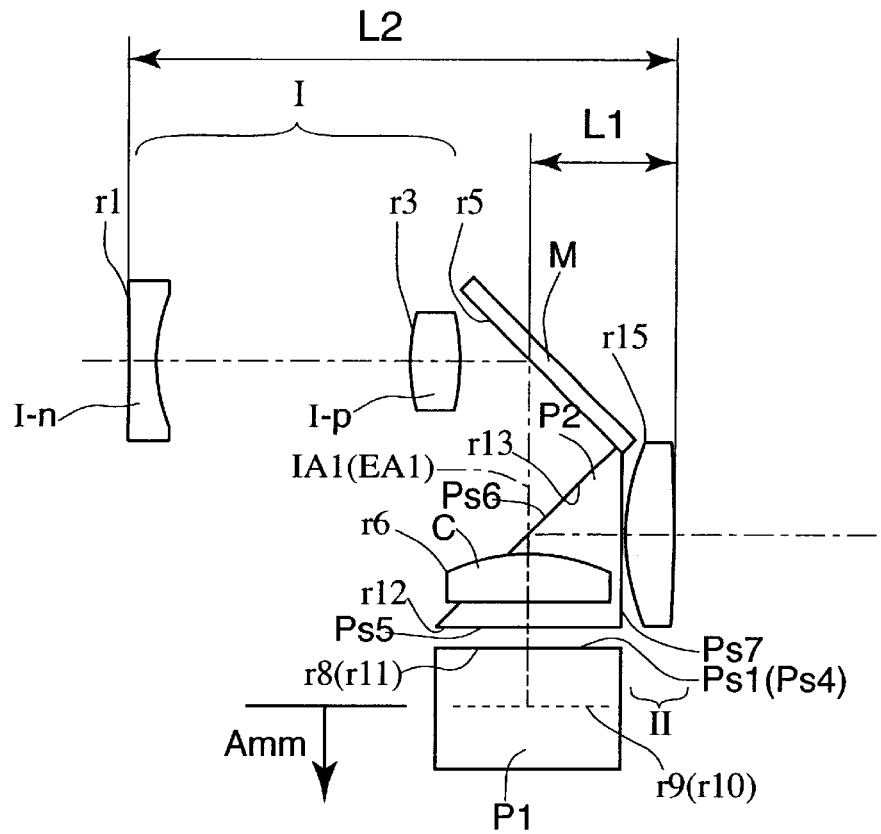
FIG. 1 is a plan view of a first embodiment of the real-image finder optical system.

In the embodiments, a real-image finder optical system includes a positive objective optical system, an erecting optical system constituted by a combination of a plurality of reflection surfaces, and a positive eyepiece optical system, and thereby an inverted image of an object, which is formed by the objective optical system and is upside down and reversed from left to right, is erected to the same orientation as the object by the erecting optical system, and the erected image is viewed through the eyepiece optical system. At least two reflections surfaces of the erecting optical system are utilized for diopter adjustment, and wherein (i) a first diopter-adjusting reflection surface and a second diopter-adjusting reflection surface come into contact with each other to form a right angle therebetween, (ii) an optical axis extending from the side of the objective optical system to the first diopter-adjusting reflection surface and an optical axis being reflected by and extending from the second diopter-adjusting reflection surface are substantially parallel with each other, (iii) these two optical axes are substantially perpendicular to an optical axis being incident from the object to the objective optical system, (iv) diopter adjustment is performed by integrally moving the first and second diopter-adjusting reflection surfaces so that the optical path length from the image forming plane of the objective optical system to the eyepiece optical system is varied, and (v) condition (1) is satisfied.

Condition (1) is for achieving a finder optical system having a suitable eye relief, and for securing a space for installing various components in the camera body, both, of which are attained by positioning the above diopter-adjusting reflection surfaces adequately closer to the eyepiece optical system with respect to the overall length of the finder optical system.

As can be understood from the drawings of each embodiment, the size of the exit surface of the eyepieces optical system is substantially the same as that of the most eyepiece-optical-system side exit surface of the right-angle prism. Furthermore, the relationship among the apparent visual angle β, the eye relief ER, and the size H of the exit surface of the eyepiece optical system (H: the distance from the optical axis to a point at which a peripheral bundle of light rays passes through) is defined as follows: H≈ER×tan β. In the case where the apparent visual angle is constant, if the size of the exit surface of the eyepiece optical system decreases, the eye-relief becomes shorter.

Consequently, if L1/L2 exceeds the lower limit of condition (1), the space for positioning the right-angle prism which is closest to the eyepiece optical system becomes too small, and the size of the exit surface of the eyepiece optical system becomes too small, and thereby an adequate eye relief cannot be maintained.

On the other hand, if L1/L2 exceeds the upper limit of condition (1), the diopter-adjusting reflection surfaces approach too close towards the object, so that the space for installing components becomes too small. As a result, another space has to be prepared for installing those components, which causes an increase of the overall size of the camera.

Specific embodiments will be described hereinafter.

[Embodiment 1]

Figure 2:
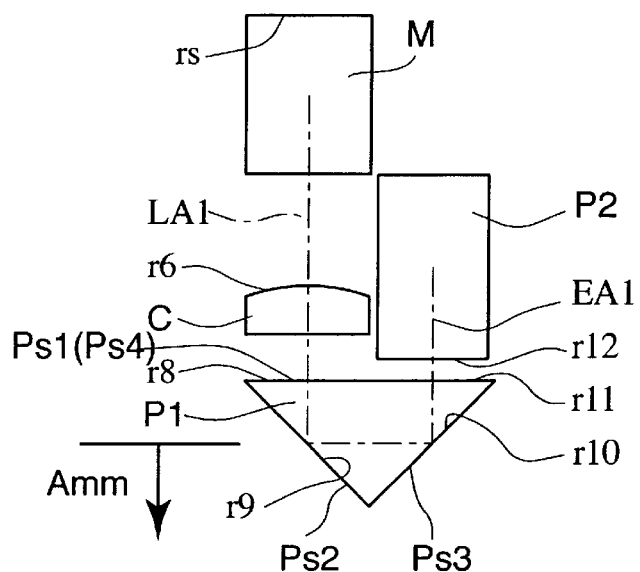
FIG. 2 is a right side elevation of the real-image finder optical system shown in FIG. 1.

FIGS. 1 and 2 show the first embodiment of the real-image finder optical system. The real-image finder optical system includes an objective optical system I, a plane mirror M, a condenser lens element C, a first right-angle prism P1 (hereinafter, the first prism) and a second right-angle prism P2 (hereinafter, the second prism), and an eyepiece optical system II. According to FIG. 1, a symbol OP1 indicates the optical axis of the objective optical system I. The optical axis OP1 is referred to as an optical axis being incident from the object. FIG. 2 is a right side elevation of the real-image finder optical system shown in FIG. 1, i.e., the real-image finder optical system is viewed from the right side of FIG. 1, and it should be noted that the eyepiece optical system II not depicted.

The objective optical system I includes a negative lens element 1-n, and a positive lens element 1-p positioned behind the negative lens element 1-n. The optical axis OP1 of the objective optical system I is deflected at a right-angle by the plane mirror M. The objective optical system I as a whole has positive power, and forms an object image on an image forming plane. The condenser lens element C is positioned in the close vicinity of the image forming plane.

The plane mirror M and the two prisms P1 and P2 constitute the erecting optical system. The first prism P1 includes the incident surface Ps1 and the exit surface Ps4 which are positioned on the same plane, and two reflection surfaces Ps2 and Ps3 which form a right angle therebetween. The second prism P2 includes an incident surface Ps5 and an exit surface Ps7 which form a right angle therebetween, and a single reflection surface Ps6. The prisms P1 and P2 are both made of a synthetic resin material. The eyepiece optical system II includes a positive single lens element.

In this embodiment, the reflection surfaces Ps2 and Ps3 are the diopter-adjusting reflection surfaces. The first prism P1 having these reflection surfaces Ps2 and Ps3 is provided so as to be moveable in the direction of an optical axis IA1. The optical axis IA1 is referred to as an incident optical axis IAl which is obtained by deflecting the optical axis OP1 by the plane mirror M. The above incident optical axis IA1 and an optical axis EA1 reflected by and extending from the second diopter-adjusting reflection surface Ps3 (hereinafter, an exit optical axis EA1) are substantially perpendicular to the optical axis OP1 being incident from the object. Since various mechanisms for supporting the first prism P1 to be moveable in the direction of the the same art, specific mechanism thereof will not be discussed herein.

The incident surface Ps1 of the first prism P1 faces the condenser lens element C, the exit surface Ps4 of the first prism P1 faces the incident surface Ps5 of the second prism P2, and the exit surface Ps7 of the second prism P2 faces the single lens element of the eyepiece optical system II. An inverted object image, which is formed by the objective optical system I and is upside down and reversed from left to right, is erected to the same orientation as the object by the erecting optical system including the plane mirror M, and the first and second prisms P1, P2, and the erected image is viewed through the eyepiece optical system II.

In the above arrangement of the optical members for the real-image finder optical system, the first prism P1 is formed so that the incident optical axis IA1 and the exit optical axis EA1 are parallel with each other. Therefore if the first prism P1 is moved along the incident optical axis IA1 in a direction away from the objective optical system I by A (millimeters), the distance between the incident surface Ps1 of the first prism P1 and the condenser lens element C increases by A (mm), and at the same time the distance between the exit surface Ps4 of the first prism P1 and the eyepiece optical system II also increases by A (mm). In other words, the optical path length from the condenser lens element C (the imaging plane of the objective optical system I) to the eyepiece optical system II increases by 2A (mm). The increase of 2A (mm) is equivalent to moving the eyepiece optical system by 2A (mm) in a conventional diopter adjusting apparatus. It should be understood that in order to obtain the same diopter adjusting range, the traveling distance of the first prism P1 is half of the traveling distance of the eyepiece optical system which is driven by a conventional diopter adjusting apparatus.

As it is clearly understood in FIG. 1, since the distance between the exit surface Ps7 of the second prism P2 and the eyepiece optical system II is made invariable, there is no need to provide a space for allowing the eyepiece optical system II to move along the optical axis thereof. Further, since the first prism P1 is made movable in a direction perpendicular to the optical axis OP1 being incident from the object, when this real-image finder optical system is installed, the thickness of the camera is not increased. As can also be seen in FIGS. 1 and 2, the surface of the prism P2 closest to the eyepiece optical system II has a rectangular shape and the movement of the erecting optical system is in a direction along a major side of the rectangular shape.

Table 1 shows the numerical data of the first embodiment. In the table, W designates the angle of view, D designates the diopter, R designates the radius of curvature of each lens surface, d designates the lens thickness or space between lens elements, $N_d$ designates the refractive index at the d-line, and v designates the Abbe number.

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10} \ldots;$$

wherein:
- x designates a distance from a tangent plane of an aspherical vertex;
- C designates a curvature of the aspherical vertex (1/R);
- h designates a distance from the optical axis;
- K designates the conic coefficient; and
- A4 designates a fourth-order aspherical coefficient;
- A6 designates a sixth-order aspherical coefficient;
- A8 designates a eighth-order aspherical coefficient;

TABLE 1

W = 28.79
D = −0.951

| Surface No. | R | d | Nd | v |
|---|---|---|---|---|
| 1* | −100.000 | 1.400 | 1.58547 | 29.9 |
| 2* | 8.231 | 13.200 | — | — |
| 3* | 8.462 | 2.600 | 1.49176 | 57.4 |
| 4 | −10.933 | 3.600 | — | — |
| 5 | ∞ | 9.902 | — | — |
| | | First Reflection Surface (plane mirror) | | |
| 6 | 9.757 | 2.500 | 1.49176 | 57.4 |
| 7 | ∞ | 2.403 | — | — |
| 8 | ∞ | 3.000 | 1.49176 | 57.4 |
| 9 | ∞ | 6.500 | 1.49176 | 57.4 |
| | | Second Reflection Surface (the first diopter-adjusting reflection surface) | | |
| 10 | ∞ | 3.000 | 1.49176 | 57.4 |
| | | Third Reflection Surface (the second diopter-adjusting reflection surface) | | |
| 11 | ∞ | 1.100 | — | — |
| 12 | ∞ | 4.800 | 1.49176 | 57.4 |
| 13 | ∞ | 4.800 | 1.49176 | 57.4 |
| | | Fourth Reflection Surface | | |
| 14 | ∞ | 0.200 | — | — |
| 15* | 10.500 | 2.500 | 1.49176 | 57.4 |
| 16 | −81.459 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| No. 1 | 0.00 | $2.0820 \times 10^{-4}$ | $-6.5430 \times 10^{-6}$ | $5.6810 \times 10^{-8}$ |
| No. 2 | 0.00 | $-5.9360 \times 10^{-4}$ | $-2.9620 \times 10^{-6}$ | 0.00 |
| No. 3 | 0.00 | $-7.7160 \times 10^{-4}$ | $-2.4610 \times 10^{-5}$ | 0.00 |
| No. 15 | 0.00 | $-2.7162 \times 10^{-4}$ | $-1.1434 \times 10^{-6}$ | 0.00 |

[Embodiment 2]

Figure 3:
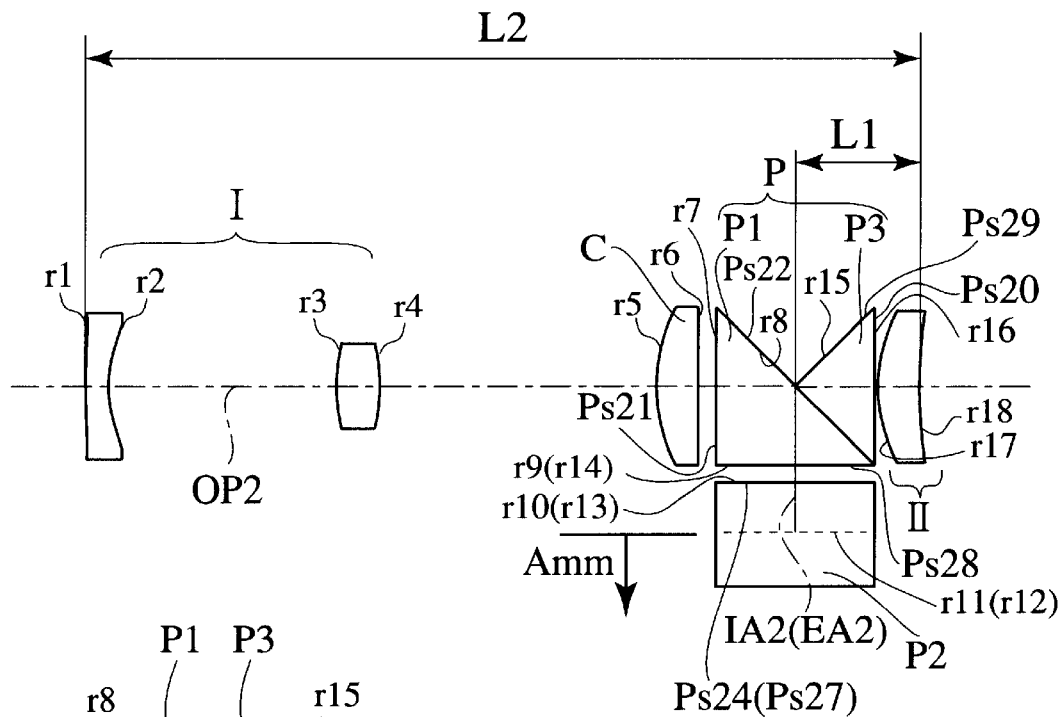
FIG. 3 is a plan view of a second embodiment of the real-image finder.
Figure 4:
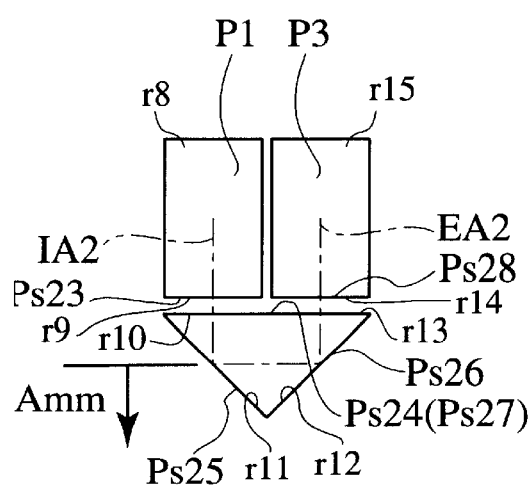
FIG. 4 is a right side elevation of the real-image finder optical system shown in FIG. 3.
Figure 5:
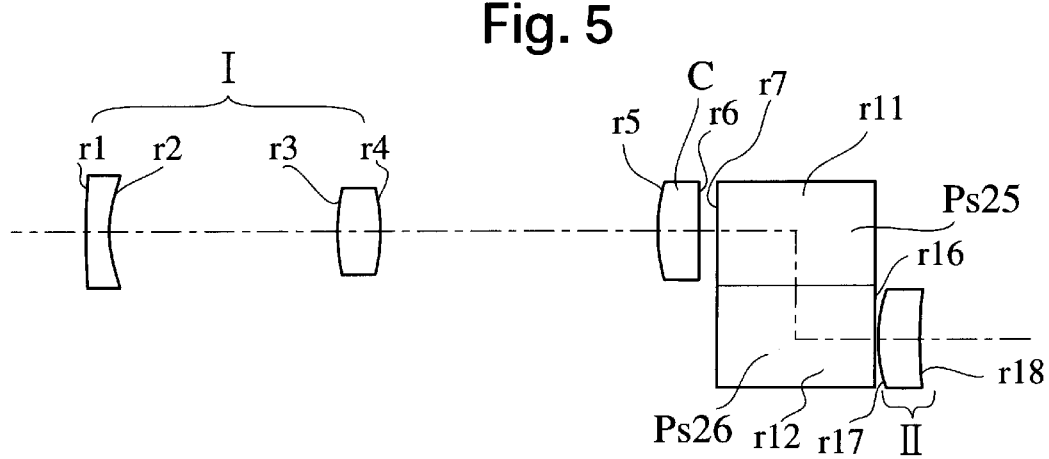
FIG. 5 is a front view of the real-image finder optical system shown in FIG. 3.

FIGS. 3 through 5 show the second embodiment of a real-image finder optical system. The real-image finder optical system includes an objective optical system I, a condenser lens element C, first through third right-angle prisms P1, P2 and P3 (hereinafter, the first through third prisms), and an eyepiece optical system II, in this order from the object. The optical arrangement of the objective optical system I, the condenser lens element C, and the eyepiece optical system II, are the same as the first embodiment. FIG. 4 is a right side elevation of the real-image finder optical system shown in FIG. 3, i.e., the real-image finder optical system is viewed from the right side of FIG. 3, and it should be noted that the eyepiece optical system II not depicted. Further, FIG. 5 shows the real-image finder optical system which is viewed from the lower side of FIG. 3.

The three prisms P1, P2 and P3 constitute an erecting optical system. The first prism P1 includes an incident surface Ps21 and an exit surface Ps23 which form a right angle therebetween, and a single reflection surface Ps22. The second prism P2 includes an incident surface Ps24 and the exit surface Ps27 which are positioned on the same plane, and two reflection surfaces Ps25 and Ps26 which form a right angle therebetween. The third prism P3 includes an incident surface Ps28 and an exit surface Ps20 which form a right angle therebetween, and a single reflection surface Ps29. Each of the first through third prisms P1, P2 and P3, is made of a synthetic resin material. According to FIG. 3, a symbol OP2 indicates the optical axis of the objective optical system I. The optical axis OP2 is referred to as an optical axis being incident from the object.

In this embodiment, the reflection surfaces Ps25 and Ps26 are the diopter-adjusting reflection surfaces. The second prism P2 having these reflection surfaces Ps25 and Ps26 is provided so as to be moveable in the direction of an optical axis IA2. The optical axis IA2 is referred to as an incident optical axis IA2 which is obtained by deflecting the optical axis OP2 by the reflection surface Ps22 of the first prism P1. The above incident optical axis IA2 and an optical axis EA2 reflected by and extending from the second diopter-adjusting reflection surface Ps26 (hereinafter, an exit optical axis EA2) are substantially perpendicular to the optical axis OP2 being incident from the object.

The incident surface Ps21 of the first prism P1 faces the condenser lens element C, the exit surface Ps23 of the first prism P1 faces the incident surface Ps24 of the second prism P2, the exit surface Ps27 of the second prism P2 faces the incident surface Ps28 of the third prism P3, and further the exit surface Ps20 of the third prism P3 faces the eyepiece optical system II.

In the above arrangement of the optical members for the real-image finder optical system, the second prism P2 is formed so that the incident optical axis IA2 and the exit optical axis EA2 are parallel with each other. Therefore if the second prism P2 is moved along the incident optical axis IA2 in a direction away from the objective optical system I by A (millimeters), the distance between the incident surface Ps24 of the second prism P2 and the exit surface Ps23 of the first prism P1 increases by amount A (mm), and at the same time the distance between the exit surface Ps27 of the second prism P2 and the incident surface Ps28 of the third prism P3 also increases by A (mm). In other words, the optical path length from the first prism P1 to the third prism P3, i.e. the distance between the condenser lens element C (image forming plane) and the eyepiece optical system II, increases by 2A (mm). The increase of 2A (mm) equivalent to moving the eyepiece optical system by 2A (mm) in a conventional diopter adjusting apparatus. It should be understood that in order to obtain the same diopter adjusting range, the traveling distance of the second right-angle prism P2 is half of the traveling distance the eyepiece optical system which is driven by a conventional diopter adjusting apparatus.

As it is clearly understood in FIG. 3, since the distance between the exit surface Ps20 of the third prism P3 and the eyepiece optical system II is made invariable, there is no need to provide a space for allowing the eyepiece optical system II to move along the optical axis thereof. Further, since the second prism P2 is made movable in a direction perpendicular to the optical axis OP2 being incident from the object, when this real-image finder optical system is installed, the thickness of the camera is not increased.

Table 2 shows the numerical data of the second embodiment.

TABLE 2

W = 28.79
D = −1.009

| Surface No. | R | d | Nd | ν |
|---|---|---|---|---|
| 1* | 28.187 | 1.400 | 1.58547 | 29.9 |
| 2* | 6.693 | 13.830 | — | — |
| 3* | 10.820 | 2.600 | 1.49176 | 57.4 |
| 4 | −11.487 | 16.767 | — | — |
| 5 | 10.626 | 2.500 | 1.49176 | 57.4 |
| 6 | ∞ | 1.100 | — | — |
| 7 | ∞ | 4.800 | 1.49176 | 57.4 |
| 8 | ∞ | 4.800 | 1.49176 | 57.4 |
| | | First Reflection Surface | | |
| 9 | ∞ | 1.100 | — | — |
| 10 | ∞ | 3.000 | 1.49176 | 57.4 |
| 11 | ∞ | 6.500 | 1.49176 | 57.4 |
| | | Second Reflection Surface (the first diopter-adjusting reflection surface) | | |
| 12 | ∞ | 4.800 | 1.49176 | 57.4 |
| | | Third Reflection Surface (the second diopter-adjusting reflection surface) | | |
| 13 | ∞ | 4.800 | 1.49176 | 57.4 |
| 14 | ∞ | 0.200 | — | — |
| 15 | ∞ | 4.800 | 1.49176 | 57.4 |
| 16 | ∞ | 0.200 | — | — |
| 17* | 9.000 | 2.500 | 1.49176 | 57.4 |
| 18 | 31.565 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| No. 1 | 0.00 | $-1.0387 \times 10^{-3}$ | $2.0430 \times 10^{-5}$ | $-1.0000 \times 10^{-7}$ |
| No. 2 | 0.00 | $-2.0112 \times 10^{-3}$ | $2.3520 \times 10^{-5}$ | 0.00 |
| No. 3 | 0.00 | $-6.6190 \times 10^{-4}$ | $4.6360 \times 10^{-5}$ | 0.00 |
| No. 17 | 0.00 | $-1.6896 \times 10^{-4}$ | $-4.8680 \times 10^{-6}$ | 0.00 |

[Third Embodiment]

Figure 6:
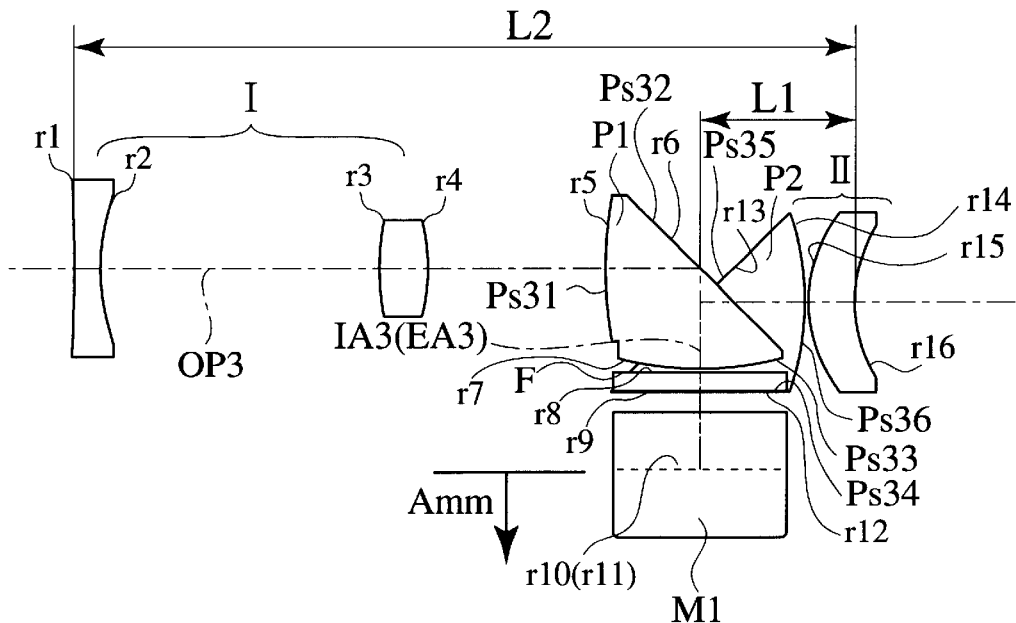
FIG. 6 is a plan view of a third embodiment of the real-image finder.
Figure 7:
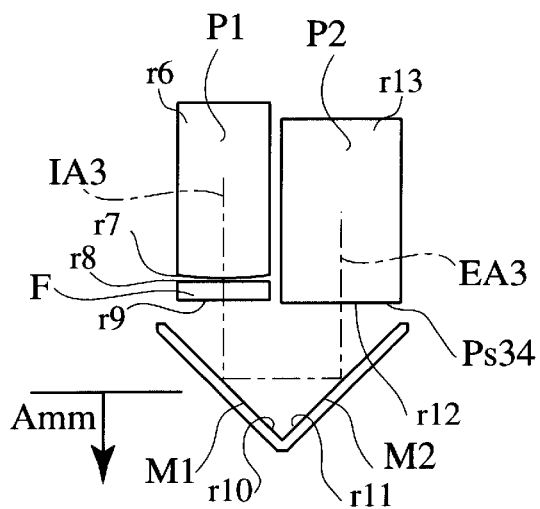
FIG. 7 is a right side elevation of the real-image finder optical system shown in FIG. 6.
Figure 8:
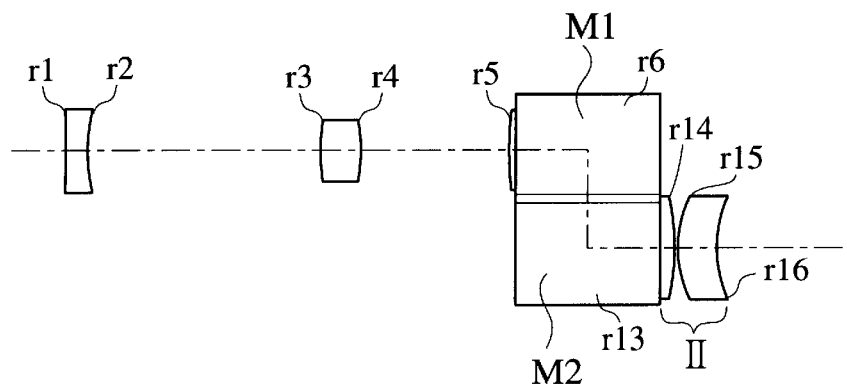
FIG. 8 is a front view of the real-image finder optical system shown in FIG. 6.

FIGS. 6 through 8 show the third embodiment of a real-image finder optical system. The real-image finder optical system includes an objective optical system I, a first right-angle prism P1 (hereinafter, the first prism P1), a field frame plate (image forming plane) F, a pair of plane mirrors M1 and M2, a second right-angle prism P2 (hereinafter, the second prism P2), and an eyepiece optical system II, in this order from the object. FIG. 7 is a right side elevation of the real-image finder optical system shown in FIG. 6, i.e., the real-image finder optical system is viewed from the right side of FIG. 6, and it should be noted that the eyepiece optical system II not depicted. Further, FIG. 8 shows the real-image finder optical system which is viewed from the lower side of FIG. 6.

The objective optical system I as a whole has positive power, and includes a negative lens element and a positive lens element positioned behind the negative lens element.

An erecting optical system is constituted by the combination of the two prisms P1, P2, and the two plane mirrors M1, M2. The first prism P1 which has an incident surface Ps31, an exit surface Ps33 and a single reflection surface Ps32 is formed so that an incident optical axis and an exit optical axis form a right angle therebetween. The first plane mirror M1 and the second plane mirror M2 are positioned to form a right angle therebetween. The second prism P2 includes an incident surface Ps34 and an exit surface Ps36 which form a right angle therebetween, and a single reflection surface Ps35. A bundle of light rays through the objective optical system I forms an image, to be viewed through the finder, on the image forming plane F which is positioned in the vicinity of the exit surface Ps33 of the first prism P1. Moreover, by forming optical surfaces having positive power on each of the incident surface Ps31 and the exit surface Ps33, the first prism P1 is formed as a lens-prism, and functions as a condenser lens element. According to FIG. 6, a symbol OP3 indicates the optical axis of the objective optical system I. The optical axis OP3 is referred to as an optical axis being incident from the object.

By forming an optical surface having positive power on the exit surface Ps36, the second prism P2 is formed as a lens-prism, and thereby the optical surface and a positive meniscus lens element constitute the eyepiece optical system II.

The incident surface Ps31 of the first prism P1 is positioned so as to face the positive lens element of the objective optical system I. The first plane mirror M1 is positioned to form an angle of 45° with respect to an optical axis IA3. The optical axis IA3 is referred to as an incident optical axis IA3 which is obtained by deflecting the optical axis OP3 by the reflection surface Ps32 of the first prism P1. Further, the incident surface Ps34 of the second prism P2 is positioned so as to form an angle of 45° with respect to the second plane mirror M2. Here, an optical axis EA3 being reflected and extending from the second plane mirror M2 towards the incident surface Ps34 is referred to as an exit optical axis EA3. The image formed on the image forming plane F is erected by the erecting optical system, and the erected image is viewed through the eyepiece optical system II.

In this embodiment, the plane mirrors M1 and M2 of the erecting optical system are the diopter-adjusting reflection surfaces. These mirrors are integrally formed as a mirror unit which is made movable along the incident optical axis IA3.

In the above arrangement of the optical members for the real-image finder optical system, the incident optical axis IA3 and the exit optical axis EA3 are parallel with each other. Therefore if the mirror unit is moved along the incident optical axis IA3 in a direction away from the objective optical system I by A (millimeters), the distance between the exit surface Ps33 of the first prism P1 and the first plane mirror M1 increases by A (mm), and at the same time the distance between the second plane mirror M2 and the incident surface Ps34 of the second prism P2 also increases by A (mm). In other words, the optical path length from the exit surface Ps33 of the first prism P1 to the incident surface Ps34 of the second prism P2 increases by 2A (mm). The increase of 2A (mm) is equivalent to moving the eyepiece optical system by 2A (mm) in a conventional diopter adjusting apparatus. It should be understood that in order to obtain the same diopter adjusting range, the traveling distance of the mirror unite is half of the traveling distance of the eyepiece optical system which is driven by a conventional diopter adjusting apparatus.

As it is clearly understood in FIG. 6, since the distance between the exit surface Ps36 of the second prism P2 and the eyepiece lens element is made invariable, there is no need to provide a space for allowing the eyepiece optical system II to move along the optical axis thereof. Further, since the mirror unit is made movable in a direction perpendicular to the optical axis OP3 being incident from the. object, when this real-image finder optical system is installed, the thickness of the camera is not increased.

Table 3 shows the numerical data of the third embodiment.

TABLE 3

W = 28.79
D = −0.998

| Surface No. | R | d | Nd | ν |
|---|---|---|---|---|
| 1* | −100.000 | 1.400 | 1.58547 | 29.9 |
| 2* | 10.046 | 14.981 | — | — |
| 3* | 11.981 | 2.600 | 1.49176 | 57.4 |
| 4 | −10.508 | 9.519 | — | — |
| 5 | 22.394 | 5.100 | 1.49176 | 57.4 |
| 6 | ∞ | 5.400 | 1.49176 | 57.4 |
| | First Reflection Surface | | | |
| 7 | −16.862 | 0.200 | — | — |
| 8 | ∞ | 1.000 | 1.49176 | 57.4 |
| 9 | ∞ | 4.200 | — | — |
| 10 | ∞ | 6.300 | — | — |
| | Second Reflection Surface (the first diopter-adjusting reflection surface) | | | |
| 11 | ∞ | 4.200 | — | — |
| | Third Reflection Surface (the second diopter-adjusting reflection surface) | | | |
| 12 | ∞ | 4.800 | 1.49176 | 57.4 |
| 13 | ∞ | 5.613 | 1.49176 | 57.4 |
| | Fourth Reflection Surface | | | |
| 14 | −15.259 | 0.200 | — | — |
| 15* | 7.228 | 2.500 | 1.49176 | 57.4 |
| 16 | 7.898 | — | — | — |

*designates the aspherical surface which is rotationally symmetrical with respect to the optical axis.

Aspherical surface data (the aspherical surface coefficients not indicated are zero (0.00)):

| Surface | K | A4 | A6 | A8 |
|---|---|---|---|---|
| No. 1 | 0.00 | $-1.2494 \times 10^{-4}$ | $1.0321 \times 10^{-5}$ | $-1.5465 \times 10^{-7}$ |
| No. 2 | 0.00 | $-7.1252 \times 10^{-4}$ | $1.1785 \times 10^{-5}$ | 0.00 |
| No. 3 | 0.00 | $-5.4400 \times 10^{-4}$ | $-2.4074 \times 10^{-5}$ | 0.00 |
| No. 15 | 0.00 | $-1.4876 \times 10^{-4}$ | $-5.2087 \times 10^{-6}$ | 0.00 |

Table 4 shows the numerical values of condition (1) for each of the first through third embodiments.

TABLE 4

| | Embodiment 1 | Embodiment 2 | Embodiment 3 |
|---|---|---|---|
| L1 | 7.500 | 7.500 | 8.313 |
| L2 | 28.200 | 50.497 | 41.913 |
| L1/L2 | 0.266 | 0.149 | 0.198 |

As made clear by Table 4, condition (1) is satisfied for each embodiment.

According to the above descriptions, a real-image finder optical system having a diopter adjustment apparatus which does not increase the thickness of the camera body can be obtained. In addition, according to the diopter adjustment apparatus, a larger diopter adjusting range can be obtained with a shorter traveling distance of the diopter-adjusting reflection surfaces.

What is claimed is:

1. A real-image finder optical system comprising:
   a positive objective optical system;
   an erecting optical system comprising a combination of a plurality of reflection surfaces; and
   a positive eyepiece optical system;
   wherein an image of an object, formed by said objective optical system, inverted and reversed from left to right, is erected to the same orientation as the object by said erecting optical system, the erected image being viewable through said eyepiece optical system;
   wherein at least two of said reflection surfaces of said erecting optical systems are utilized for diopter adjustment;
   wherein a first diopter-adjusting reflection surface and a second diopter-adjusting reflection surface contact each other at a right angle;
   wherein a first optical axis extending from a side of said objective optical system to said first diopter-adjusting reflection surface and a second optical axis of light reflected by and extending from said second diopter-adjusting reflection surface are parallel;
   wherein said first and second optical axes are perpendicular to a third optical axis extending between the object and said objective optical system;
   wherein diopter adjustment is performed by integrally moving said first and second diopter-adjusting reflection surfaces so that an optical path length between an image forming plane of said objective optical system and said eyepiece optical system changes; and
   wherein the following relationship is satisfied:

$0.1 < L1/L2 < 0.4$ wherein
   L1 designates a distance, in a direction parallel with said third optical axis between an optical axis of said second diopter-adjusting reflection surface and the final surface of said eyepiece optical system; and
   L2 designates a distance, extending in the direction parallel with said third optical axis between the object-most side surface of said objective optical system and the final surface of said eyepiece optical system;
   the most eyepiece side surface of said erecting optical system having a rectangular shape, said first and second diopter-adjusting surfaces being movable along a direction corresponding to a major side of the rectangular shape.

2. The real-image finder optical system according to claim 1, wherein the moving direction of said diopter-adjusting reflection surfaces is perpendicular to said third optical axis.

3. The real-image finder optical system according to claim 1, wherein said two diopter-adjusting reflection surfaces comprise a right-angle prism.

4. The real-image finder optical system according to claim 3, wherein said right-angle prism is made of a synthetic resin material.

5. The real-image finder optical system according to claim 1, wherein said two diopter-adjusting reflection surfaces comprise two plane mirrors which are integrally formed as a mirror unit.

6. The real-image finder optical system according to claim 5, wherein said mirror unit is made of a synthetic resin material.

7. The real image finder optical system according to claim 1, wherein the following relationship is satisfied:
wherein the following relationship is satisfied:

$$0.1 < L1/L2 \leq 0.266.$$

8. A real-image finder optical system comprising:
a positive objective optical system;
an erecting optical system consisting of a combination of four reflection surfaces; and
a positive eyepiece optical system;
wherein an image of an object, formed by said objective optical system inverted and reversed from left to right, is erected to a same orientation as the object by said erecting optical system, said erected image being viewable through said eyepiece optical system;
wherein at least three of said four reflection surfaces are provided on a side of said eyepiece optical system with respect to an image forming plane of said objective optical system, and two of said at least three reflection surfaces are utilized for diopter adjustment;
wherein a first diopter-adjusting reflection surface and a second diopter-adjusting reflection surface contact each other at a right angle;
wherein a first optical axis, extending from a side of said objective optical system to said first diopter-adjusting reflection surface, and a second optical axis, of light reflected by and extending from said second diopter-adjusting reflection surface, are parallel;
wherein said first and second optical axes are perpendicular to a third optical axis extending between the object and said objective optical system;
wherein diopter adjustment is performed by integrally moving said first and second diopter-adjusting reflection surfaces along a direction of said first optical axis, so that an optical path length from an image forming plane of said objective optical system to said eyepiece optical system is changed; and
wherein the following relationship is satisfied:

$$0.1 < L1/L2 < 0.4$$

wherein
L1 designates a distance, in a direction parallel with said third optical axis, between the optical axis extending from said second diopter-adjusting reflection surface and the final surface of said eyepiece optical system; and
L2 designates a distance, in a direction parallel with said third optical axis, between the most-object side surface of said objective optical system and the final surface of said eyepiece optical system; and
the most eyepiece side surface of said erecting optical system having a rectangular shape, said first and second diopter-adjusting surfaces being movable along a direction corresponding to a major side of the rectangular shape.

9. The real-image finder optical system according to claim 8, wherein the moving direction of said diopter-adjusting reflection surfaces is perpendicular to said third optical axis.

10. The real-image finder optical system according to claim 8, wherein said two diopter-adjusting reflection surfaces comprise a right-angle prism.

11. The real-image finder optical system according to claim 10, wherein said right-angle prism is a synthetic resin material.

12. The real-image finder optical system according to claim 8, wherein said two diopter-adjusting reflection surfaces comprise two plane mirrors which are integrally formed as a mirror unit.

13. The real-image finder optical system according to claim 12, wherein said mirror unit is a synthetic resin material.

* * * * *